United States Patent [19]

Alves

[11] Patent Number: 5,054,011
[45] Date of Patent: Oct. 1, 1991

[54] ADJUSTABLY MOUNTED PORTABLE COMPACT DISC PLAYER

[75] Inventor: Roger J. Alves, Simi Valley, Calif.

[73] Assignee: Scosche Industries, Inc., Moorpark, Calif.

[21] Appl. No.: 342,969

[22] Filed: Apr. 25, 1989

[51] Int. Cl.$^5$ ............................................. G11B 33/00
[52] U.S. Cl. ..................................... 369/12; 267/175; 267/140; 403/90
[58] Field of Search ............... 369/12, 292, 1, 2, 11; 403/90, 114, 115; 267/177, 175, 140, 141.3; 360/137

[56] References Cited

U.S. PATENT DOCUMENTS

| | | | |
|---|---|---|---|
| 590,835 | 9/1897 | Harteg | 403/115 |
| 1,602,451 | 10/1926 | Reardou | 267/175 |
| 1,667,362 | 4/1928 | Van Der Vliet | 267/175 |
| 3,070,394 | 12/1962 | Dunn | 267/175 |
| 3,604,027 | 8/1969 | Konno | 267/177 |
| 3,824,472 | 7/1974 | Engel et al. | |
| 3,952,154 | 4/1976 | Gates, Jr. | 369/2 |
| 4,096,927 | 6/1978 | Takatsu | 267/140 |
| 4,399,528 | 8/1983 | Suzuki | |
| 4,401,298 | 8/1983 | Eaton | 267/141.3 |
| 4,455,948 | 6/1984 | Torres | |
| 4,457,501 | 7/1984 | Davis | 267/177 |
| 4,602,358 | 7/1986 | Sato | 369/12 |
| 4,673,376 | 6/1987 | Feuder | 403/90 |
| 4,682,319 | 7/1987 | Einhaus | |
| 4,721,414 | 1/1988 | Aklyama | 267/140 |
| 4,790,520 | 12/1988 | Tanaka | 267/141.3 |
| 4,811,314 | 3/1989 | Alves | |
| 4,886,230 | 12/1989 | Jones | 403/90 |

FOREIGN PATENT DOCUMENTS

| | | | |
|---|---|---|---|
| 458112 | 10/1913 | France | 403/90 |
| 476699 | 8/1915 | France | 403/90 |

OTHER PUBLICATIONS

Stereo Review, Sony Article, 7/99, p. 72.

Primary Examiner—Stuart S. Levy
Assistant Examiner—John Pokotylo
Attorney, Agent, or Firm—William W. Haefliger

[57] ABSTRACT

Adjustable mounting structure for a compact disc player includes a platform to support the player; an arm supporting the platform; ball and socket swivel elements, one of the elements supporting the arm; and a bracket supporting the other of the ball and socket elements, the bracket attachable to included vehicle passanger compartment structure; the socket element adjustably clamping the ball element to frictionally resist relative swiveling thereof. Switching circuitry is to be connected with the platform and has terminals connectible with
  i) speaker circuitry,
  ii) audio circuitry, and
  iii) a player output connection.

23 Claims, 8 Drawing Sheets

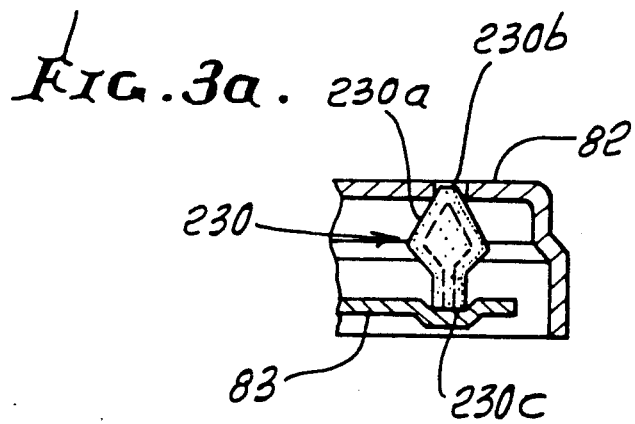
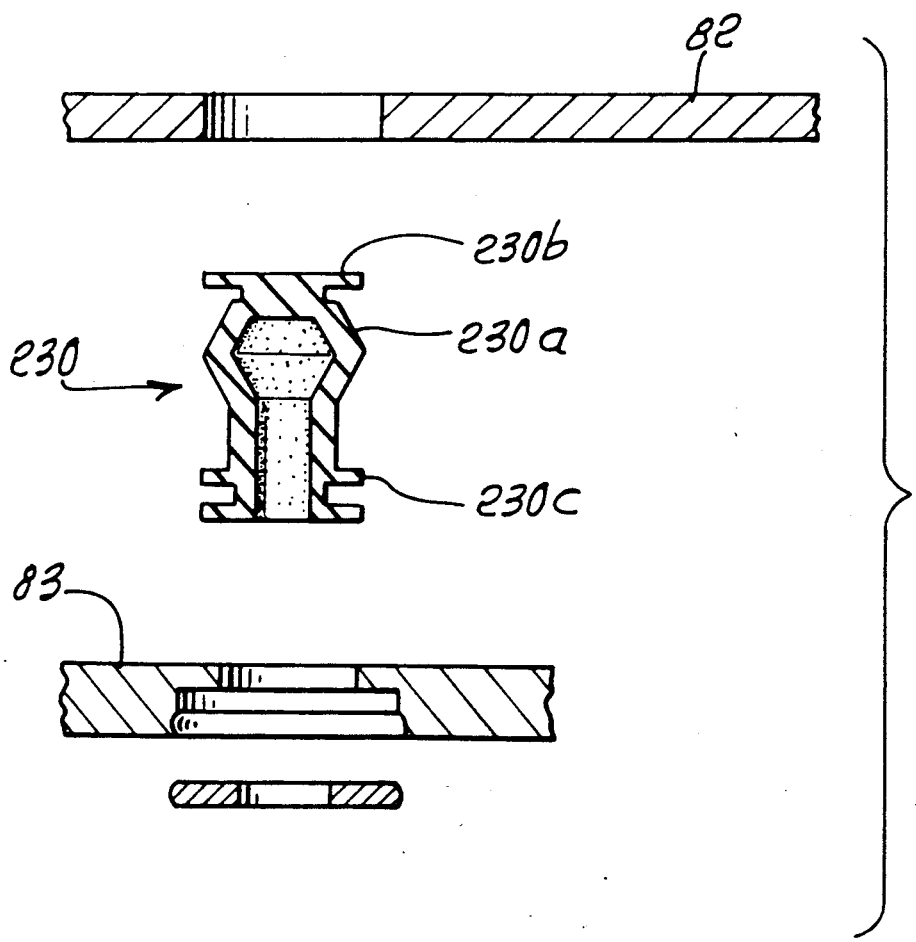

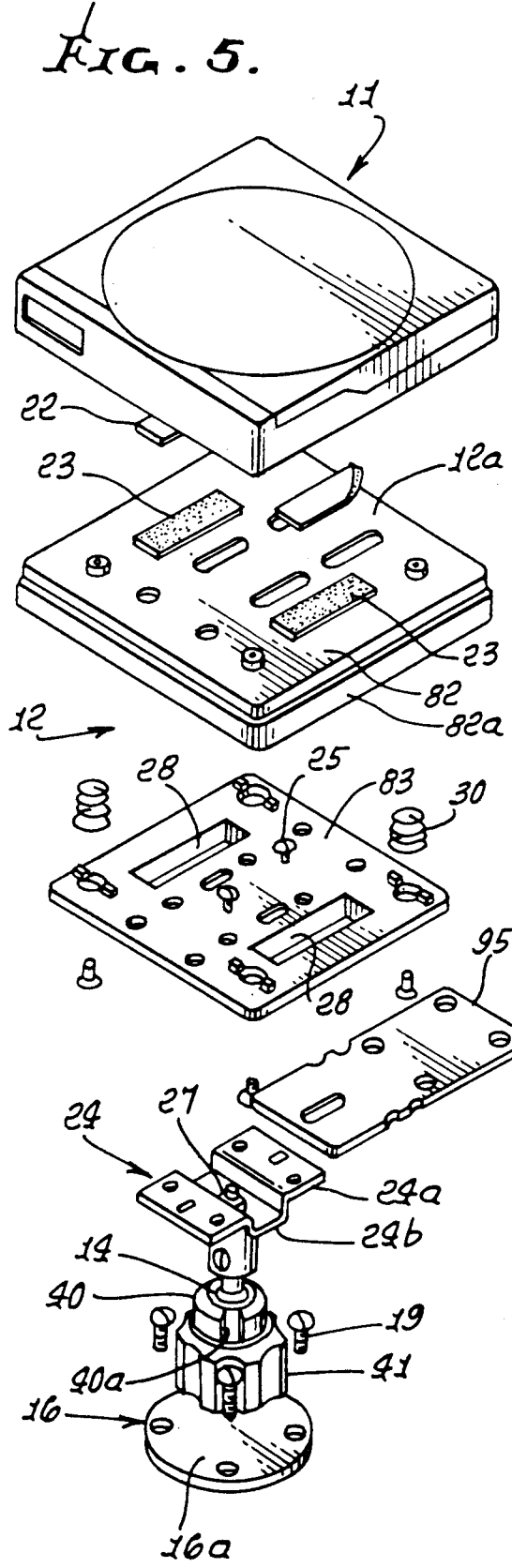
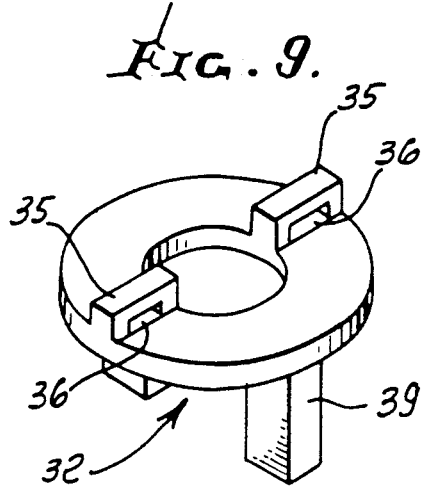
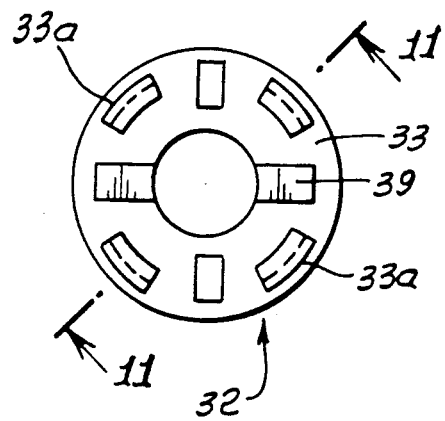
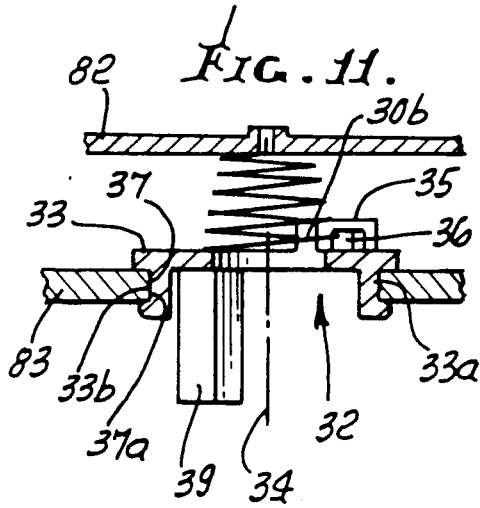

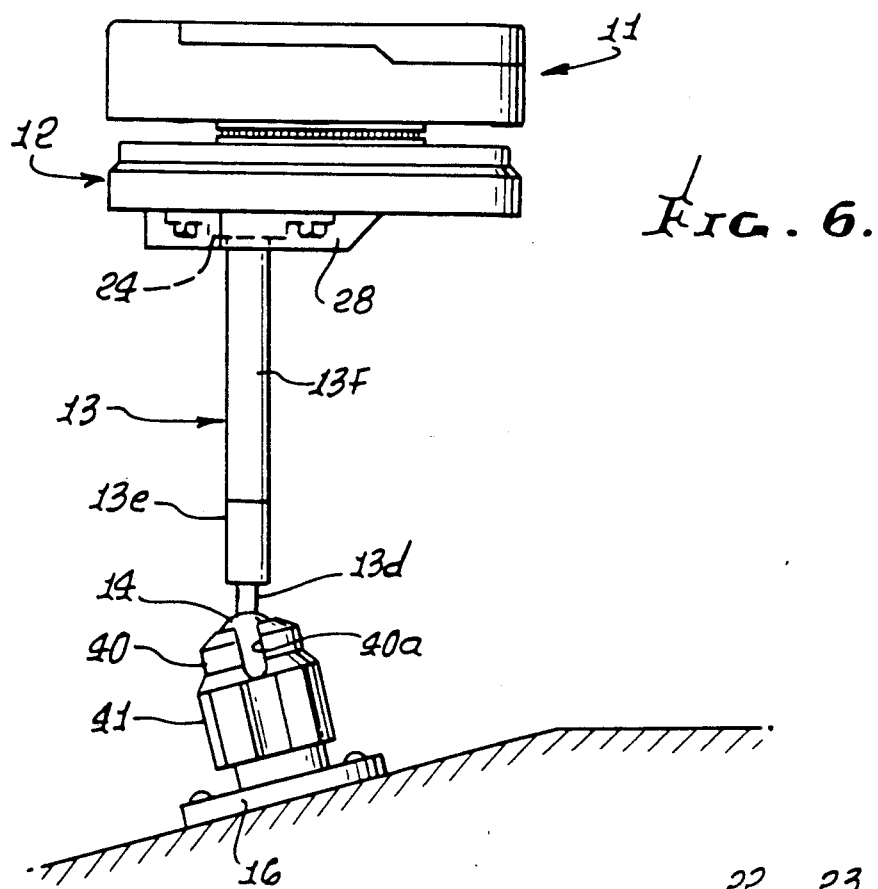
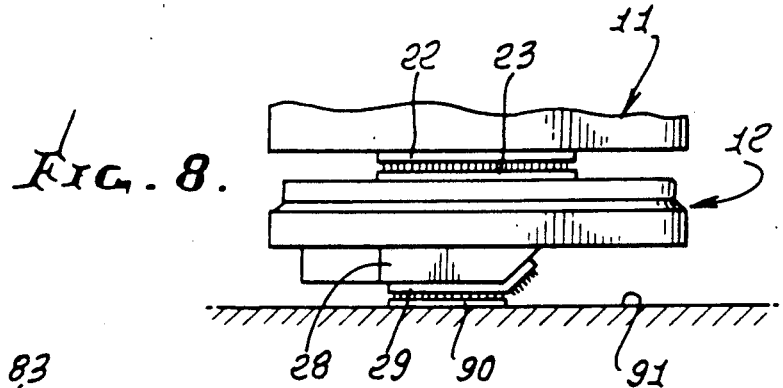
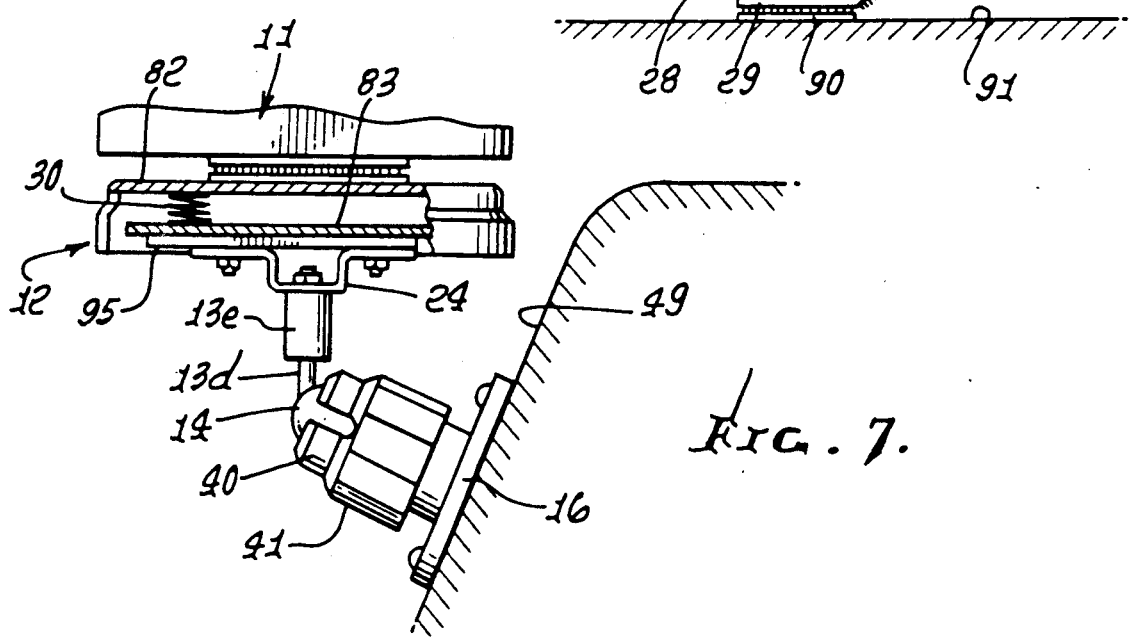

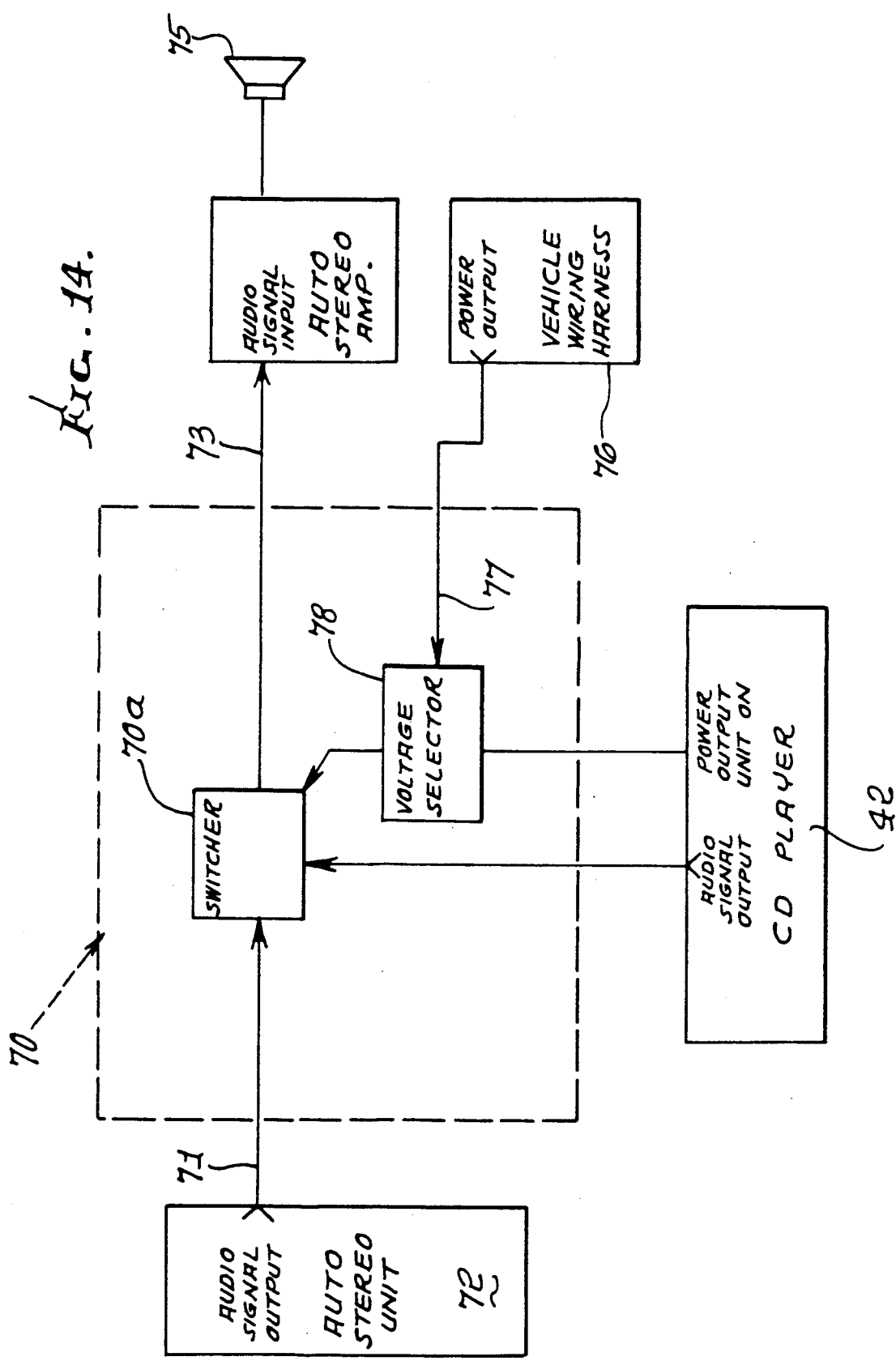

ADJUSTABLY MOUNTED PORTABLE COMPACT DISC PLAYER

BACKGROUND OF THE INVENTION

This invention relates generally to use of compact disc players in vehicles, and more particularly to combinations of hardware and circuitry adapting a portable CD player to audio circuitry utilized in vehicles.

Vehicles most commonly have radio and/or stereo circuitry and speakers, in place; whereas portable compact disc players are not integrated into that circuitry. As a result, the vehicle occupant must turn off his radio or stereo, and turn on his CD player, or vice versa, when he wants to hear one or the other. There is no convenient way to operate one switch to accomplish the changeover, and there is consequently need for such switching equipment; also there is need for positioning the player so that not only is a compact disc readily changeable, but also the player is located in compatible position for a "one-switch" control, as referred to.

SUMMARY OF THE INVENTION

It is a major object of the invention to provide a solution to the above problem, meeting the described need. Basically, the invention is addressed to that solution, and contemplates the provision of a vehicle audio system having speaker and audio (radio or stereo) circuitry, and wherein there is also provided the following:

a) a carrier, and means thereon to attach the carrier to a vehicle passenger compartment panel to be supported by the panel, b) a platform supported by the carrier for adjustable movement relative to the panel, c) a compact disc player supported by the platform for movement therewith between a first position in which a compact disc carried by the player is positioned for removal and a second position or positions, the player having an output connection, d) a switching circuit associated with the platform and having terminals electrically connectible with:
  i) the speaker circuitry,
  ii) the audio circuitry, and
  iii) the player output connection, e) the switching circuitry being operable to have a first or static position in which the audio circuitry is connected with the speaker circuitry, and a second and alternate position in which the player output connection is connected with the speaker circuitry.

It is another object to provide audio circuits which comprises stereo circuitry, the switching circuitry carried by vehicle structure independently of said carrier, to be connected with the player placed on the platform; and another object is to provide audio circuitry which comprises radio circuitry, the switching circuitry carried by vehicle structure independently of the carrier, to be connected with the player placed on the platform. Further, the switching circuitry may have a first position in which the audio circuitry is connected with the speaker circuitry, and a second and alternate position in which the player output connection is connected with the speaker circuitry.

It is yet another object to provide adjustable mounting means for a compact disc player, including:

a) a platform to support the player, b) an arm supporting the platform, c) ball and socket swivel elements, one of the elements supporting the arm, and d) a bracket supporting the other of the ball and socket elements, the bracket attachable to vehicle passenger compartment structure, e) the socket element clamping the ball element to frictionally resist relative swiveling thereof.

As will appear, the portable CD player may be attached to the platform via hook and pile means, to be readily accessible to the driver or other passenger in the vehicle; and the bracket may be attachable to vehicle dash structure or to vehicle floor panel structure, as will appear.

Yet another object is to provide the platform to include primary and secondary plates, and spring means yieldably supporting the primary plate on the secondary plate, the primary plate attached to the player and the secondary plate attached to said arm. The spring means may advantageously comprise multiple coil springs each having opposite ends respectively attached to the two plates; and spring tension adjusting means may be operatively connected with the multiple springs for controlling vibration isolation.

These and other objects and advantages of the invention, as well as the details of an illustrative embodiment, will be more fully understood from the following specification and drawings, in which:

DRAWING DESCRIPTION

FIG. 3a is a fragmentary section; and FIG. 3b is a modification;

FIG. 5 is an exploded view showing components of the FIGS. 1-4 apparatus;

FIG. 6 is an elevation showing tilt support of the platform and player; and swingable arm structure attached to vehicle panel means;

FIG. 7 is a view like FIG. 6 showing alternative support of the platform and CD player on a shortened arm, attached to vehicle panel means;

FIG. 8 is an elevation showing support of the platform directly to a vehicle panel;

FIG. 9 is a perspective view of a platform spring support adjustor;

FIG. 10 is a bottom plan view of the FIG. 9 adjustor;

FIG. 11 is a section taken on lines 11—11 of FIG. 10; and

FIGS. 12-14 are circuit diagrams.

DETAILED DESCRIPTION

Figure 1:
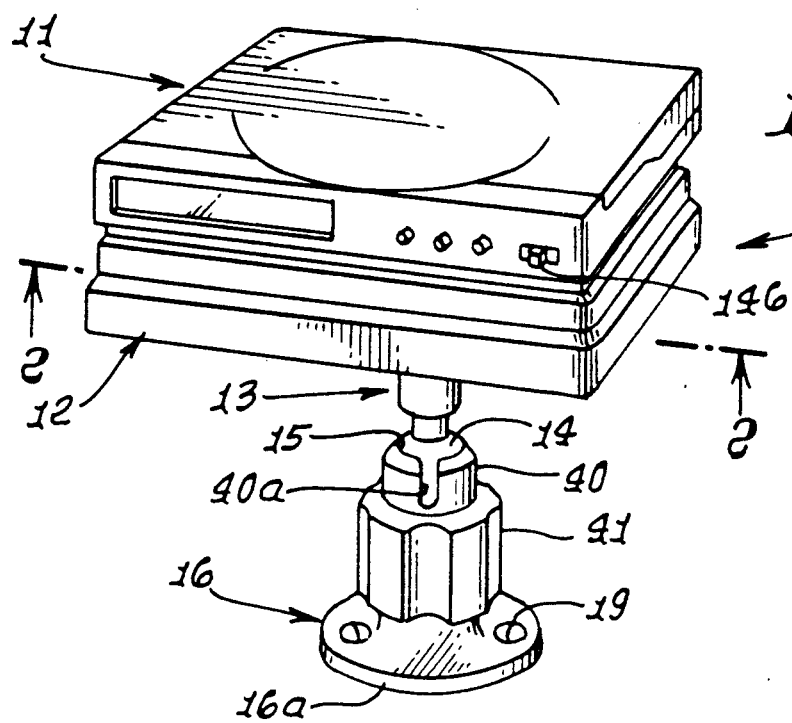
FIG. 1 is a perspective view of a compact disc player supported on a platform which is on swingable arm structure.
Figure 2:
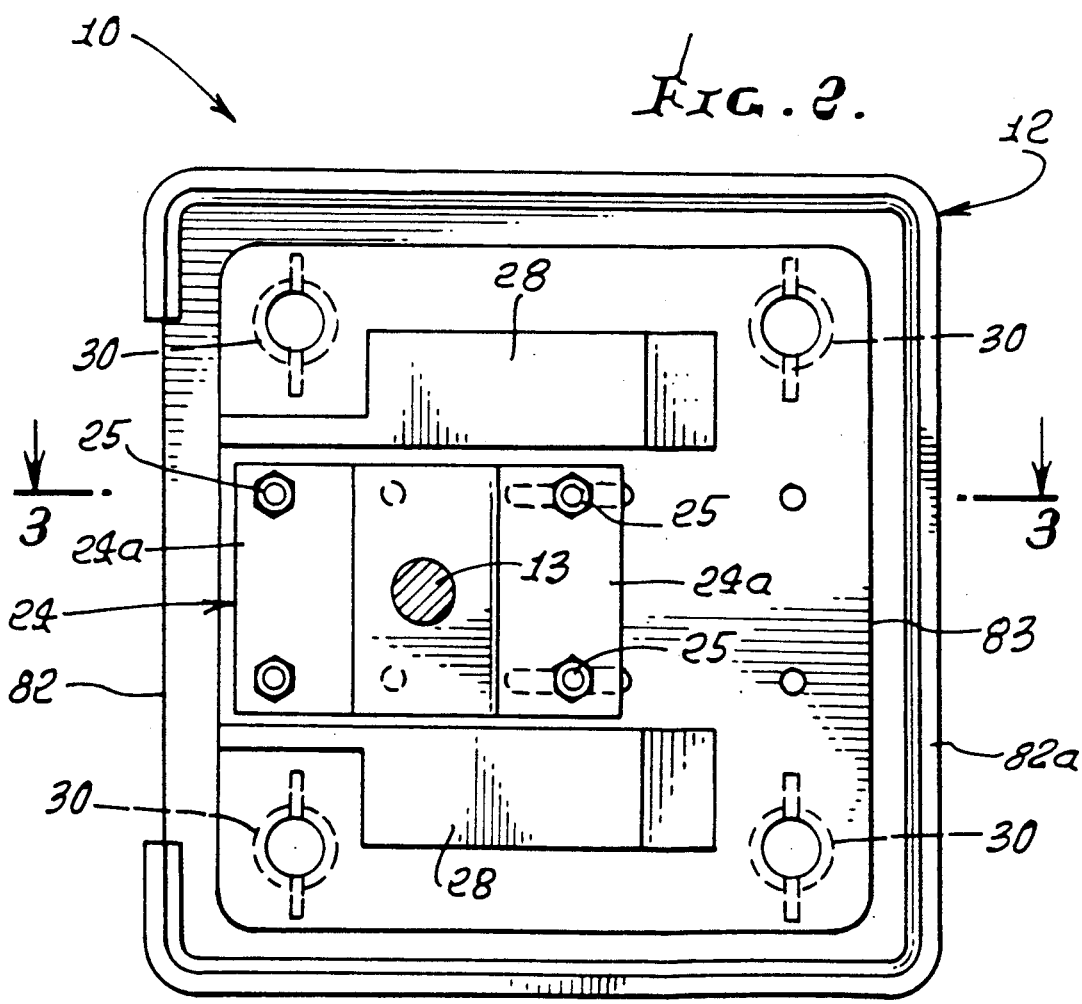
FIG. 2 is an enlarged bottom plan view on lines 2—2 of FIG. 1.
Figure 3:
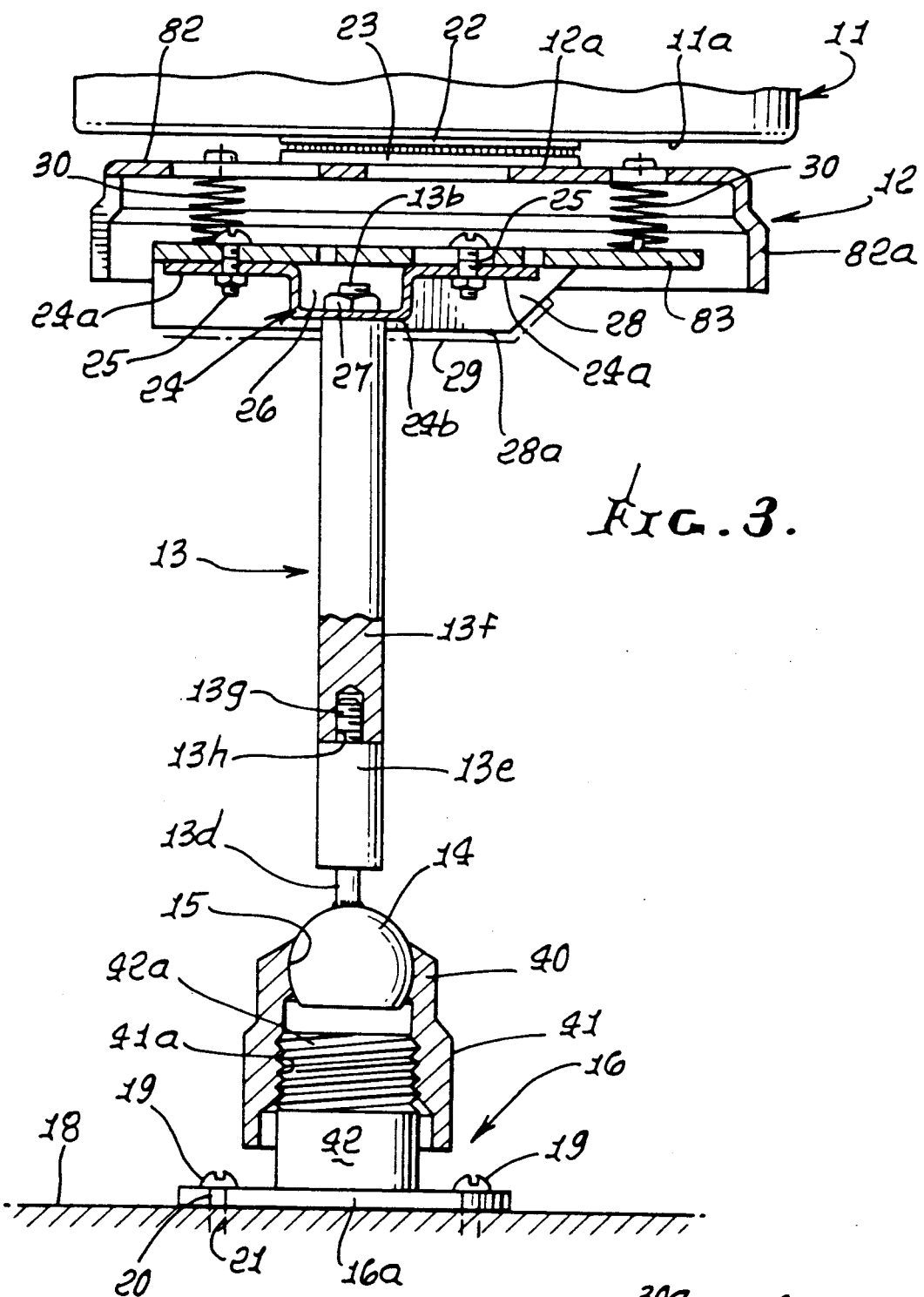
FIG. 3 is a section in elevation taken on lines 3—3 of FIG. 2.
Figure 4:
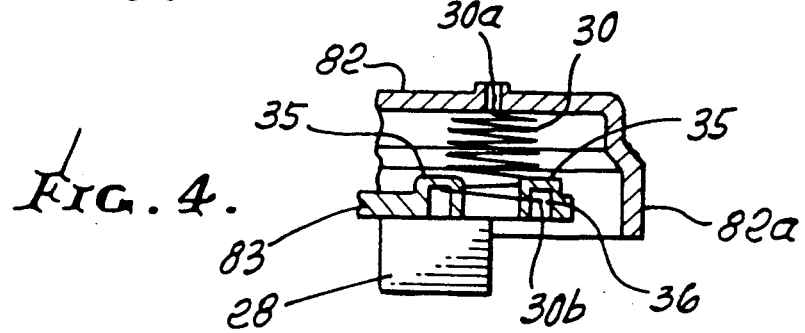
FIG. 4 is a fragmentary section of a portion of FIG. 3 showing spring compression.

Referring to FIGS. 1, 2, 3, and 5, the illustrated mounting means 10 for mounting a compact disc (CD) player 11 includes a platform 12 to support the player; an arm 13 supporting the platform; ball and socket swivel elements 14 and 15, one of which (such as ball 14) supports the arm 13; and a bracket 16 supporting the other of the ball and socket elements (such as socket 15). The bracket 16 has a base 16a attachable to vehicle passenger compartment structure, such as floor panel 18, as via fasteners 19 passing through openings 20 through the base and openings 21 in the panel.

The CD player is advantageously made removably attachable to the top of the platform, as via hook and pile means. The latter may include lower strips 22 attached to the bottom 11a of the player, to face downwardly, and upper strips 23 attached to the face downwardly, and upper strips 23 attached to the top 12a of the platform. Strips 22 may incorporate hook or pile elements, and strips 23 may incorporate pile or hook elements (i.e. VELCRO). Thus, the player is positionally adjustable (removably) to the platform.

The platform 12 includes an upper and primary plate 82, typically made of molded plastic, defining top surface 12a, and a lower or secondary plate 83 supporting plate 82. Plate 83 is attached to the upper end of arm 13, as via a bracket 24 with legs 24a attached via fasteners 25 to the plate 83. Skirt 82a of the part 12 conceals plate 83. The bracket includes a U-shaped portion 24b defining a space 26 into which the threaded upper end 13b of the arm projects, for attachment to a nut 27. There are two horizontally elongated lugs 28 integrally molded to plastic plate 83, to project downwardly and define horizontal surfaces 28a below the level of the bracket 24. Hook or pile (Velcro, for example) strips 29 are bonded to the lower surfaces 28a of the two lugs for direct and removable attachment to pile or hook strips 90 on a vehicle compartment panel 91, as in FIG. 8, i.e., after detaching of the arm 13 from the bracket 24. Thus, the CD player can be mounted on the swingable arm 13, or directly attached to the floor or other panel 91, by the attachment means described.

Also provided is spring means 30 yieldably supporting the primary plate 82 on the secondary plate 83 to isolate the CD player from sharp impacts as may be created when the vehicle rides over road bumps or obstructions. The spring means is shown in the form of multiple coil springs 30, four being illustrated as operating in parallel to cushion impact loads. The wire springs have their upper ends 30a anchored to the upper plate, so as not to be rotatable; and the springs have their lower side anchored to the lower plate 83 as via spring tension adjusters 32 operating connected to the lower end portion of the springs; to adjust spring tension as desired, for adjusting the cushioning protected by the springs. FIG. 3a shows modified springs in the form of hollow, tubular, rubber bodies 230 interfitting the plates 82 and 83. Bodies 230 have divergent (conical) positions 230a adapted to resiliently flex under load so as to provide vibration isolation to the supported CD player. FIG. 3b shows details of the body 230, with attachments, at its upper and lower ends 230b and 230c.

The four adjusters 32 shown in FIG. 11 comprise disc-like rotary bodies 33, carried by the lower plate 83 to be individually adjustable (rotatably) about upright central axes 34, so as to progressively clamp the coils of the springs as the adjusters are rotated. Thus, each adjuster has at least one and preferably two upright brackets 35 each forming a sidewardly exposed through slot 36 to pass the coil wire 30b near the coil base (see FIGS. 4 and 9-11). Brackets 35 are eccentric relative to axis 34. A skirt 33a on the body 33 forms an annular groove 33b to fit the rim 37 of an opening 37 in the plate 83, allowing guided rotation of the body 33, so as to progressively relatively feed the coil wire through the slot 36 as each eccentric bracket rotates about axis 34, thereby to decrease or increase the exposed, operative extent of the coil wire above the bracket 35 and below upper plate 82. A downwardly extending lug 39 integral with each body 33, projects freely for manual grasping below plate 83 for individually rotating that body. Wide variations in spring tension can be achieved due to individual adjustment of the four different springs and their effective tensions.

The socket 15 is formed by a split annulus 40 above a nut 41 integral with the annulus. Note vertical split 40a in FIG. 1. The nut has internal threads 41a meshing with external threads 42a on a post 42 carried on bracket 16. As nut 41 threads downwardly (i.e. is tightened) on the thread 42a, the annulus tightens rotatably, causing socket 15 to increasingly clamp the ball 14. Thus, the angularity of the arm 13 may be adjusted by loosening the nut to allow ball 14 to swing in any direction (i.e. universally), followed by retightening the nut. The split 40a is adapted to receive the narrowed (reduced diameter) rod extent 13d of the arm 13 to allow extreme pivoting of the arm relative to the base, as would be necessary when bracket base 16a is attached to a vertical panel. Note in FIG. 3 the arm section 13e to which rod 13d is integral, section 13e attached to section 13f as by a threaded part 13g received in threaded opening 13h in section 13f. This allows disconnecting of sections 13e and 13f, to shorten the effective arm length, and direct connection of part 13g to bracket 24, as via nut 27. See FIG. 7. The CD player is then closely connectible to the passenger compartment mounting panel 49 of the vehicle. FIG. 7 also shows use of an optimal bracket 95 between bracket 24 and plate 83.

The compact disc player is conventional in design and operation, and is well known. One example is Model SL-XP5 made by Technics, Division of Matsushita, Japan.

In accordance with an important aspect of the invention, switching circuitry is associated with the apparatus and has terminals electrically connectible with:

i) speaker circuitry on the vehicle,
  ii) audio circuitry on the vehicle,
  iii) and an output connection on the compact disc player Further, that switching circuitry is manually or automatically operable to have a first or static position in which the audio circuitry (as for example a car radio) is connected with the vehicle speaker circuitry; and a second and alternate position in which the compact disc player output connection is then connected with the speaker circuitry on the vehicle. Accordingly, the user can quickly switch either way, i.e., to obtain either radio or other audio (stereo for example) programming on the vehicle speaker system, or compact disc player output on his vehicle speaker, and at the same time his player remains housed as discussed above. Also, if his compact disc player is playing, i.e., the on-off control at 146 is "ON", the user can quickly switch by means of the referenced alternate switching circuitry on his radio output, and back and forth at any time, using only that one alternate switch.

Figure 12:
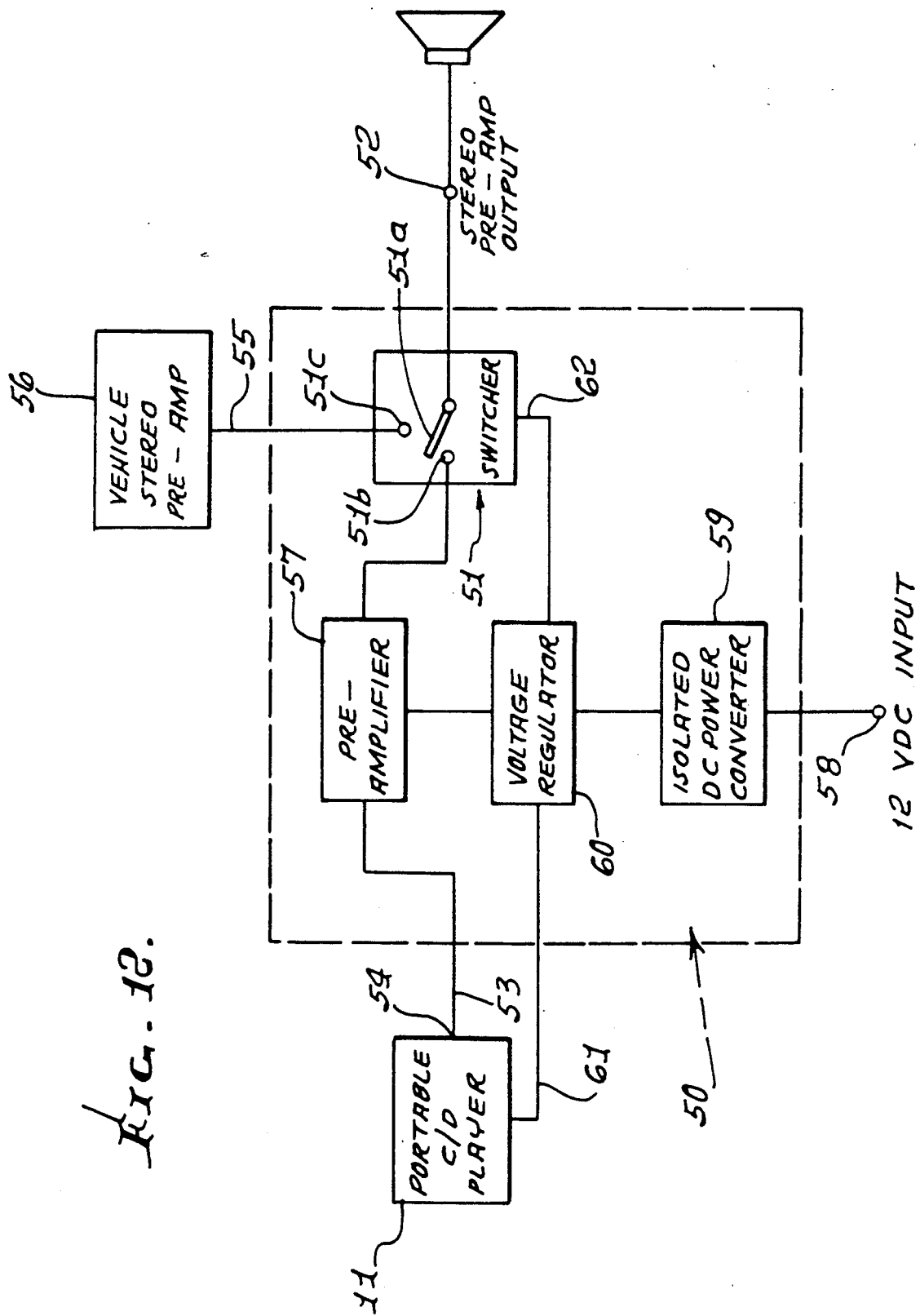

See for example FIG. 12 wherein switching circuitry is indicated by block 50 within which a switcher 51 is shown as having output at 52 to a vehicle speaker circuit input 52. The circuitry 50 has an input at 53 from the output 54 of portable CD player 11 as described above; and the circuitry 50 has a second input at 55 from the vehicle stereo pre-amplifier 56. Circuitry 50 may include a pre-amplifier at 57 between 53 and 51. Power input is indicated as including a 12 volt supply 58, DC power converter 59 within circuitry 50, and voltage regulator 60 connected at 61 and 62 with 11 and 51 respectively. Thus, the switcher circuitry may be provided with suitable connections at 52, 53, 55, 58, and 61. In simplified form, the switcher 51 includes a switch arm 51a connected with 52, and connectible with either one of the two contacts 51b and 51c, the former indirectly connected to 11 via optional element 57 and the latter to 56.

Figure 13:
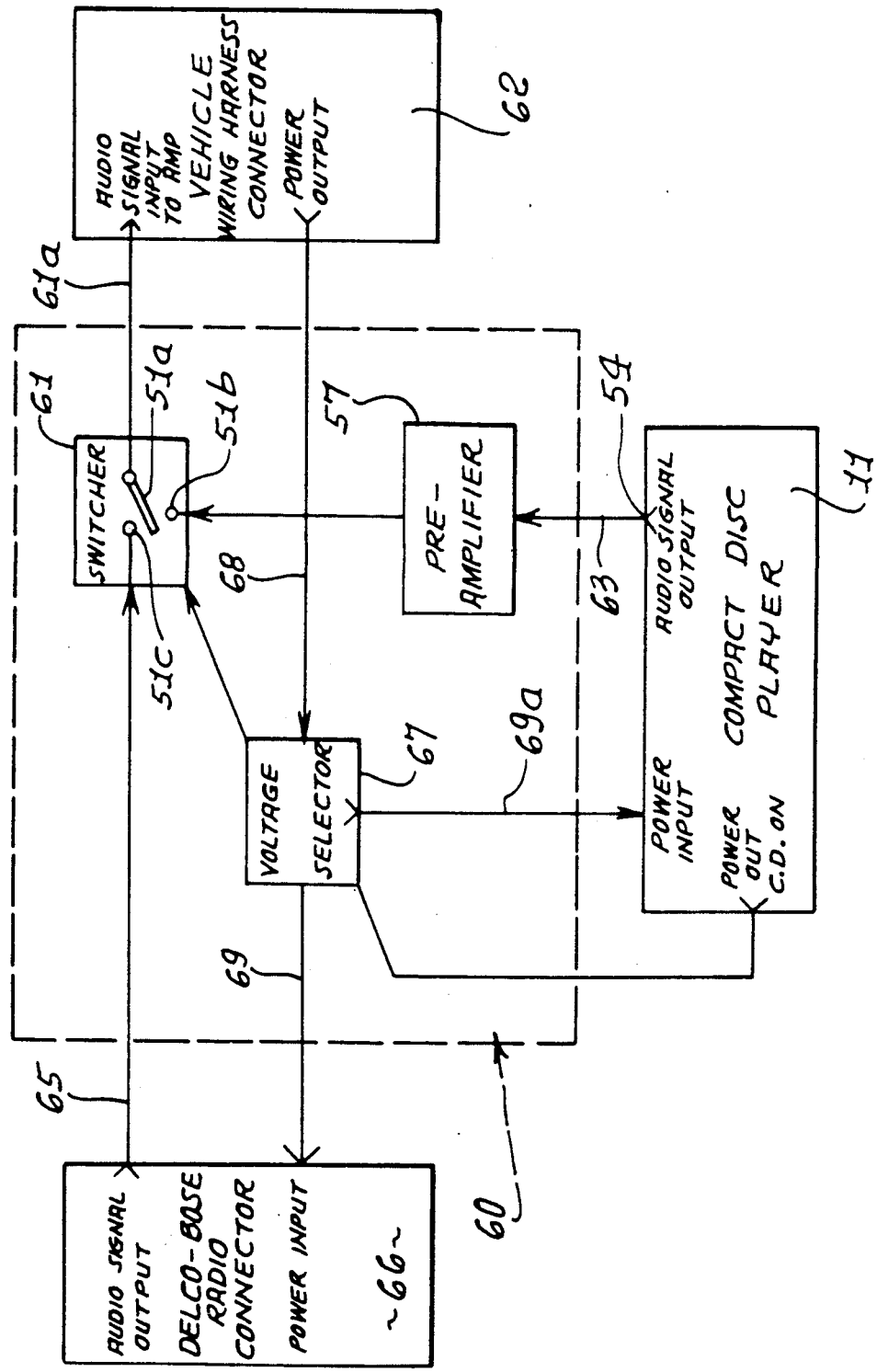

In FIG. 13, switching circuitry indicated by block 60 includes a switcher 61 having output at 61a to vehicle wiring harness 62 representative of vehicle speaker circuitry. The block 60 has an input at 63 from output at 54 of the portable compact disc player 11. Circuitry 60 has a second input at 65 from a vehicle radio, as via a Delco Bose (or other) radio connector 66, for example A pre-amplifier 57 is employed within 60 with a voltage selector 67, to which power is supplied via line 68 from harness 62, for supply on line 69 to the radio and on line 69a to the units 54 and 57.

In FIG. 14, the circuitry is similar to FIGS. 12 and 13, except that the switcher 70a switches between the output of CD player 42 and the output at 71 of an auto stereo unit 72, for selected audio signal delivery at 73 to the auto stereo amplifier 74 and then to the auto speaker 75. Power is supplied by 76, 77 and voltage selector 78.

The circuitry in any of the blocks 50, 60 and 70 may be associated with the carrier platform 12; for example, it may be located at the rear of the carrier platform, and have terminals indicated at 81 for establishing the connections indicated at 52, 55, and 58 in FIG. 13. Also, it has jack connections to connect to the portable CD player 11 when the latter is placed into position on the platform, as via a flexible cable and plugs. Other arrangements and locations of circuitry 50, 60 and 70 are possible.

The elements 51a, 51b and 51c may be conveniently located, in association with the apparatus and/or the instrument panel.

I claim:

1. An adjustable mounting means for a compact disc player, the combination comprising:
   a) a platform to support the player, the player attached to the platform,
   b) an arm supporting the platform,
   c) ball and socket swivel elements, one of the elements supporting the arm, and
   d) a bracket supporting the other of the ball and socket elements,
   e) the socket element clamping the ball element to frictionally resist relative swiveling thereof,
   f) a nut carried by the bracket to progressively cause the socket element to clamp the ball element in response to nut and socket rotation in one direction,
   g) the socket element integral with the nut and defining a slot into which the arm is selectively rotatable as the ball element swivels relative to the socket element, whereby the arm may rotate to an extreme angle relative to the bracket,
   h) and including vehicle passenger compartment panel structure to which said bracket is attached and oriented so that the said bracket, nut and socket element are inclined relative to horizontal, and said slot is oriented to allow extreme upward pivoting of the arm relative to the inclined socket element.

2. The combination of claim 1 including
   i) said compact disc player supported by the platform for movement therewith between a first position in which a compact disc carried by the player is positioned for removal, and a second position in which the disc may be concealed, the player having an output connection,
   j) a switching circuit associated with the platform and having terminals electrically connectible with:
      i) speaker circuitry,
      ii) audio circuitry, and
      iii) a player output connection,
   k) the switching circuitry being manually or automatically operable.

3. The combination of claim 2 wherein said audio circuitry comprises stereo circuitry, the switching circuitry carried by vehicle structure independently of said carrier, to be connected with the player placed on the platform.

4. The combination of claim 2 wherein said audio circuitry comprises radio circuitry, the switching circuitry carried by vehicle structure independently of said carrier, to be connected with the player placed on the platform.

5. The combination of claim 2 including hook and pile means removably attaching the player to the platform.

6. The combination of claim 5 wherein the player includes a top closure which is tiltable upwardly, the player attached to the top of the platform.

7. The combination of claim 2 wherein the carrier is attached to said panel which is one of the following:
   i) a dashboard panel
   ii) a floor panel 8. The combination of claim 2 wherein the switching circuitry has a first position in which the audio circuitry is connected with the speaker circuitry, and a second and alternate position in which the player output connection is connected with the speaker circuitry.

9. The combination of claim 1 including hook and pile means removably attaching the player to the platform.

10. The combination of claim 9 wherein said hook and pile means comprises first and second strips adhesively attached to the platform and player, respectively, there being hook structure integral with one of the strips and pile structure integral with the other of the strips, the hook structure removably attaching to the pile structure.

11. The combination of claim 1 wherein the platform includes primary and secondary plates, and yieldable means yieldably supporting the primary plate on the secondary plate, the primary plate attached to the player and the secondary plate attached to said arm.

12. The combination of claim 11 wherein said yieldable means includes multiple coil springs each having opposite ends respectively attached to the two plates.

13. The combination of claim 12 including spring tension adjusting means operatively connected with the spring means.

14. The combination of claim 12 including spring tension adjusters operatively connected with the coil springs.

15. The combination of claim 14 wherein said adjusters comprise rotary bodies, each rotary body carried by one of the plates to progressively clamp the coil of one of the springs as that body is rotated in one direction relative to the plate.

16. The combination of claim 11 wherein said yieldable means comprises vibration isolators having rubber construction.

17. The combination of claim 16 wherein said isolators have conical portions located between the plates and having rubber construction.

18. The combination of claim 11 wherein said yieldable means comprises multiple rubber bodies.

19. The combination of claim 1 including a switching circuit associated with the carrier and having terminals electrically connectible with:
   i) speaker circuitry,
   ii) audio circuitry, and
   iii) a player output connection,
   iv) the switching circuitry being manually or automatically operable.

20. The combination of claim 1 wherein the passenger compartment structure is defined by one of the following:
   vehicle dash structure
   vehicle floor panel structure 21. The combination of claim 1 wherein the arm has detachable connection to the platform, and including hook or pile attachment means carried by the platform at the underside thereof for direct connection to a pile or hook attachment means on a support panel, after detachment of the arm from the platform.

22. The combination of claim 1 including an annulus supporting the socket element, the annulus defining a split into which a narrowed portion of the arm is receivable when the ball is rotated about 90° from a position in which the arm extends coaxially with the annulus.

23. The combination of claim 1 wherein the arm includes two sections having threadable interconnection, whereby one section attached to the ball element may be directly attached to the platform when the other arm section attached to the platform is detached therefrom and is also detached from said one section.

* * * * *